No. 883,941. PATENTED APR. 7, 1908.
M. P. EAGAN.
HOSE COUPLING.
APPLICATION FILED FEB. 23, 1907.

WITNESSES.
A E Crombie
A. H. Smith

INVENTOR.
Michael P. Eagan
By Charles T. Hannigan,
Attorney.

UNITED STATES PATENT OFFICE.

MICHAEL P. EAGAN, OF NEWPORT, RHODE ISLAND.

HOSE-COUPLING.

No. 883,941.

Specification of Letters Patent.

Patented April 7, 1908.

Application filed February 23, 1907. Serial No. 358,998.

*To all whom it may concern:*

Be it known that I, MICHAEL P. EAGAN, a citizen of the United States, residing at the city of Newport, county of Newport, and State of Rhode Island, have invented certain new and useful Improvements in Hose-Couplings, of which the following is a specification.

The object of my invention is to provide a hose-coupling which is simple in construction and effective in operation; and it consists of two members, one of which carries a locking-pin and also means to prevent a leakage of water after both members are coupled together.

Figure 1:
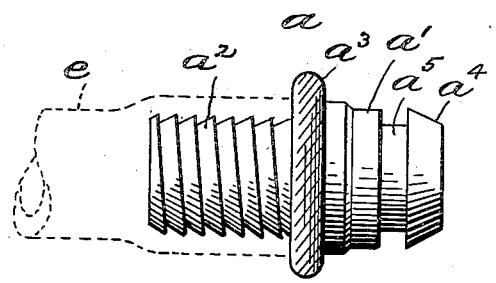
Figure 2:
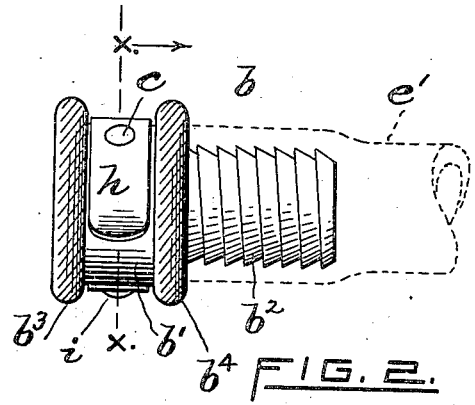
Figure 3:
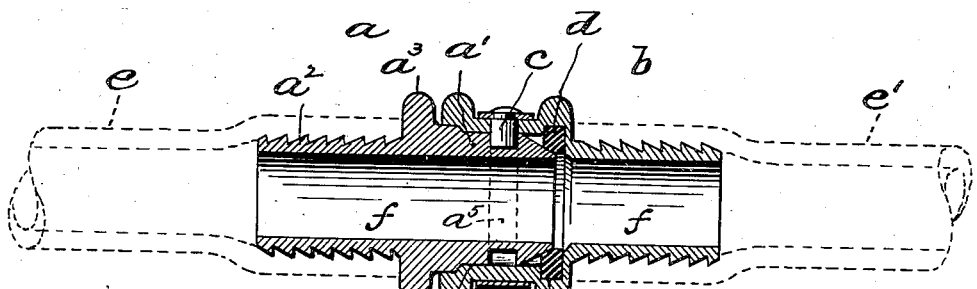
Figure 4:
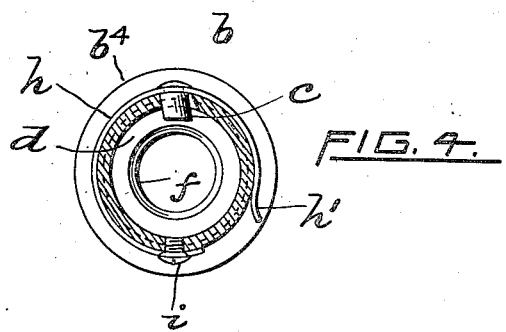

In the accompanying sheet of drawings, Figure 1 represents a side elevation of the male member of my improved hose-coupling. Fig. 2 is a side elevation of the female member. Fig. 3 is a central longitudinal sectional view illustrating the members as coupled together, and, Fig. 4 is a cross sectional view of the female member, taken in line $x$.—$x$. of Fig. 2, showing the locking-pin and packing-ring as carried by said member.

Like reference characters indicate like parts throughout the views.

My improved hose-coupling comprises a male member $a$; a female member $b$; a spring-pressed locking-pin $c$ and packing-ring $d$, the two latter parts being carried by said female member. The members $a$ and $b$ are of equal length and cast in tubular form. The male member $a$, has a central annular flange $a^3$, to the rear end of which it is formed with screw threads $a^2$. To the front of flange $a^3$, the male member is formed with an annular enlarged portion $a^6$, a similar portion $a^1$, of less diameter than $a^6$, and connected to the latter by an annular beveled portion $a^7$. Thus as shown in Fig. 3, when the male and female members are properly positioned with respect to one another a tight joint is formed. The outer end of the head $a^1$ of the member $a$ is beveled, as at $a^4$, and next to this beveled portion in said member is formed a circumferential groove $a^5$. The female member $b$ has a head $b^1$ and a screw-threaded portion $b^2$ respectively, and this member has an annular flange $b^3$ formed at its outer end, and another annular flange $b^4$ formed at a point between the head $b^1$ and threaded portion $b^2$. Each of the flanges $b^3$, $b^4$ has its surface knurled to grip upon in screwing the threaded portion of the member $b$ within the hose-pipe-connection $e^1$. The bores $f, f$ of the members $a$ and $b$ are of equal size and correspond to the inner diameter of the pipe-connections $e$ and $e^1$.

The head $b^1$ of the member $b$ is bored concentric to and of larger diameter than its bore $f$, to receive snugly therethrough the head $a^1$ of the member $a$, and this larger bore in the head $b^1$, designated by reference character $b^5$ in Fig. 3, terminates with a recess $b^6$ that surrounds the inner portion of the flange $b^4$ of said member $b$. In the recess $b^6$, formed in the head of the member $b$, is securely mounted the rubber packing-ring $d$, which is substantially square-shape in cross section and whose inner diametrical portion projects close to the bore $f$ in said member. A contractile flat spring $h$ partially surrounds the head of the member $b$ and has one end secured thereto by a screw $i$, and intermediate the length of said spring is made fast an angularly disposed pin $c$, which enters through a circular opening enlarged at its bottom and formed in the wall of said head, in the manner shown in Figs. 3 and 4. The free end of this spring $h$ is curved slightly outward, as at $h^1$, to permit of lifting the pin $c$ from its inner or closed position on the member $b$.

When the head of the member $a$ is forced within the member $b$ its beveled portion $a^4$ causes the pin $c$ to move out from the chamber of the head $b^1$ until acted upon, by the spring $h$, to find its position in the groove $a^5$ of said member $a$.

Prior to the pin $c$ locking both members together as described, the beveled portion $a^4$ will have entered within and compressed the packing-ring $d$, in the manner shown in Fig. 3, and thus sealing the coupling against leakage of steam, air, or water.

By my construction and arrangement of parts, I form a device which can be quickly coupled together and disconnected; a device which can be used to advantage for connecting all flexible pipes, such as boiler-hose, air-brake-hose, fire-hose, and the like, and at the same time a device that is simple, durable, and inexpensive to manufacture.

What I claim and desire to secure by Letters-Patent, is—

In a hose coupling, a male member having a central outwardly projecting annular flange to engage the hose end, an annular enlarged portion to the front of said flange, a second annular portion spaced from said first portion and of less diameter than the latter, a beveled annular connecting portion between said first named portions, a beveled outer end on said male member with a circumferential groove formed between said outer end and said second named annular portion, a female member having an interior opening shaped to receive said two annular portions, and said beveled portion of the male member, an annular exterior flange at the outer end of said female member, a second annular exterior flange spaced from the first and overlying the inner end of said interior opening of the female member, said female member having a circumferential recess which is formed in said second named exterior flange thereof, packing in said recess, a flat contractile spring in the form of the major part of a circle secured to said female member in the space between said flanges thereof, and an angularly disposed pin carried by said spring at a point diametrically opposite its point of securement, said female member having an opening formed therein and enlarged at its base to receive said pin.

In testimony whereof I affix my signature in presence of two witnesses.

MICHAEL P. EAGAN.

Witnesses:
A. E. CROMBIE,
A. H. SMITH.